(12) United States Patent
Kambara et al.

(10) Patent No.: US 11,465,575 B2
(45) Date of Patent: Oct. 11, 2022

(54) IN-VEHICLE BACKUP POWER SOURCE CONTROL APPARATUS AND IN-VEHICLE BACKUP POWER SOURCE APPARATUS

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Hisanori Kambara, Yokkaichi (JP); Yuuki Sugisawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 17/263,936

(22) PCT Filed: Aug. 1, 2019

(86) PCT No.: PCT/JP2019/030116
§ 371 (c)(1),
(2) Date: Jan. 28, 2021

(87) PCT Pub. No.: WO2020/027238
PCT Pub. Date: Feb. 6, 2020

(65) Prior Publication Data
US 2021/0316680 A1  Oct. 14, 2021

(30) Foreign Application Priority Data
Aug. 2, 2018 (JP) .............................. JP2018-145699

(51) Int. Cl.
*B60L 1/00* (2006.01)
*B60L 3/00* (2019.01)
(Continued)

(52) U.S. Cl.
CPC .......... *B60R 16/033* (2013.01); *H02J 7/0047* (2013.01); *H02J 7/0068* (2013.01); *H02J 7/007194* (2020.01); *H02J 2207/20* (2020.01)

(58) Field of Classification Search
CPC ...... B60R 16/033; B60R 16/03; H02J 7/0047; H02J 7/0068; H02J 7/007194; H02J 2207/20; H02J 9/061; H02J 7/345
(Continued)

(56) References Cited

U.S. PATENT DOCUMENTS

2009/0102434 A1    4/2009  Nakajima et al.
2013/0175858 A1*   7/2013  Sakurai .................. B60L 53/22
                                                        307/9.1
2020/0189414 A1    6/2020  Morita

FOREIGN PATENT DOCUMENTS

JP    2012-91629 A    5/2012
JP    2017-70057 A    4/2017
JP    2017-163713 A   9/2017

OTHER PUBLICATIONS

International Search Report, Application No. PCT/JP2019/030116, dated Oct. 1, 2019. ISA/Japan Patent Office.

* cited by examiner

*Primary Examiner* — Richard Tan
(74) *Attorney, Agent, or Firm* — Honigman LLP

(57) ABSTRACT

An increase in the capacity of a power storage unit is effectively suppressed. An in-vehicle backup power source control apparatus includes a discharge unit, a control unit, and a temperature obtaining unit. The control unit controls a discharge operation such that an output voltage of the discharge unit reaches a target voltage. The temperature obtaining unit obtains the temperature of a power storage unit. When the temperature obtained by the temperature obtaining unit is within a predetermined first temperature
(Continued)

range, the control unit sets the target voltage to a first target voltage, and when the temperature obtained by the temperature obtaining unit is within a predetermined second temperature range that is higher than the first temperature range, the control unit sets the target voltage to a second target voltage that is higher than first target voltage.

5 Claims, 7 Drawing Sheets

(51) Int. Cl.
    *H02G 3/00*         (2006.01)
    *B60R 16/033*     (2006.01)
    *H02J 7/00*         (2006.01)

(58) Field of Classification Search
    USPC .......................................................... 307/9.1
    See application file for complete search history.

IN-VEHICLE BACKUP POWER SOURCE CONTROL APPARATUS AND IN-VEHICLE BACKUP POWER SOURCE APPARATUS

CROSS-REFERENCE TO RELATED APPLICATIONS

This application is the U.S. national stage of PCT/JP2019/030116 filed on Aug. 1, 2019, which claims priority of Japanese Patent Application No. JP 2018-145699 filed on Aug. 2, 2018, the contents of which are incorporated herein.

TECHNICAL FIELD

The present disclosure relates to an in-vehicle backup power source control apparatus and an in-vehicle backup power source apparatus.

BACKGROUND

Techniques for backing up an in-vehicle power source unit are known as in-vehicle power source systems. In a system described in JP 2017-70057A, for example, if there is a failure or the like in a vehicle battery that is an in-vehicle power source unit, a voltage adjusted by a voltage boosting circuit based on an output voltage of a capacitor unit that is a power storage unit is output to a load. This realizes backup of the in-vehicle power source unit.

However, in such a system, increases in the cost and size of the power storage unit due to an increase in the capacity of the power storage unit have been a problem.

The present disclosure has been made in order to solve at least one of the above-described issues, and aims to effectively suppress an increase in the capacity of a power storage unit.

SUMMARY

An in-vehicle backup power source control apparatus according to a first aspect of the present disclosure uses, as a backup power source, a power storage unit that is charged by an in-vehicle power source unit, and controls a discharge operation of the power storage unit. The in-vehicle backup power source control apparatus includes a voltage conversion unit that performs a voltage conversion operation for stepping up or down a voltage applied to a first conductive path that is a path through which power is supplied from the power storage unit, and applies an output voltage to a second conductive path that, along with a third conductive path that is connected to a backup target load, constitutes a path for supplying power to the backup target load. A control unit controls the voltage conversion operation such that the output voltage that is applied to the second conductive path by the voltage conversion unit reaches a target voltage. A temperature obtaining unit obtains a temperature of the power storage unit, and when the temperature obtained by the temperature obtaining unit is within a predetermined first temperature range, the control unit sets the target voltage to a first target voltage, and, when the temperature obtained by the temperature obtaining unit is within a predetermined second temperature range that is higher than the first temperature range, the control unit sets the target voltage to a second target voltage that is higher than the first target voltage.

An in-vehicle backup power source control apparatus according to a second aspect of the present disclosure uses, as a backup power source, a power storage unit that is charged by an in-vehicle power source unit, and controls a discharge operation of the power storage unit. The in-vehicle backup power source control apparatus includes a voltage conversion unit that performs a voltage conversion operation for stepping up or down a voltage applied to a first conductive path that is a path through which power is supplied from the power storage unit, and applies an output voltage to a second conductive path that, along with a third conductive path that is connected to a backup target load, constitutes a path for supplying power to the backup target load. A control unit controls the voltage conversion operation such that the output voltage that is applied to the second conductive path by the voltage conversion unit reaches a target voltage. A temperature obtaining unit obtains a temperature of the power storage unit, and the higher the temperature obtained by the temperature obtaining unit is, the higher the target voltage the control unit sets.

An in-vehicle backup power source control apparatus according to a third aspect of the present disclosure uses, as a backup power source, a power storage unit that is charged by an in-vehicle power source unit, and controls a discharge operation of the power storage unit. The in-vehicle backup power source control apparatus includes a voltage conversion unit that performs a voltage conversion operation for stepping up or down a voltage applied to a first conductive path that is a path through which power is supplied from the power storage unit, and applying an output voltage to a second conductive path that, along with a third conductive path that is connected to a backup target load, constitutes a path for supplying power to the backup target load. A control unit controls the voltage conversion operation such that the output voltage that is applied to the second conductive path by the voltage conversion unit reaches a target voltage. A temperature obtaining unit obtains a temperature of the third conductive path, and when the temperature obtained by the temperature obtaining unit is within a predetermined first temperature range, the control unit sets the target voltage to a first target voltage, and, when the temperature obtained by the temperature obtaining unit is within a predetermined second temperature range that is higher than the first temperature range, the control unit sets the target voltage to a second target voltage that is higher than the first target voltage.

An in-vehicle backup power source control apparatus according to a fourth aspect of the present disclosure uses, as a backup power source, a power storage unit that is charged by an in-vehicle power source unit, and controls a discharge operation of the power storage unit. The in-vehicle backup power source control apparatus includes a voltage conversion unit that performs a voltage conversion operation for stepping up or down a voltage applied to a first conductive path that is a path through which power is supplied from the power storage unit, and applying an output voltage to a second conductive path that, along with a third conductive path that is connected to a backup target load, constitutes a path for supplying power to the backup target load. A control unit controls the voltage conversion operation such that the output voltage that is applied to the second conductive path by the voltage conversion unit reaches a target voltage. A temperature obtaining unit obtains a temperature of the third conductive path, and the higher the temperature obtained by the temperature obtaining unit is, the higher the target voltage the control unit sets.

An in-vehicle backup power source apparatus according to a fifth aspect of the present disclosure includes the power storage unit, and the in-vehicle backup power source control apparatus according to any one of the first to fourth aspects.

Advantageous Effects of Disclosure

In the above-described in-vehicle backup power source control apparatus according to the first aspect, the control unit controls the control voltage conversion operation such that the output voltage that is applied to the second conductive path by the voltage conversion unit reaches the target voltage. It is necessary to determine the target voltage at this time in anticipation of power loss due to the resistance of the third conductive path that connects the second conductive path and the backup target load. In particular, when the temperature of the third conductive path is high, the resistance of the third conductive path is high, and thus, it is necessary to determine the target voltage so as to supply power required for driving the backup target load, to the backup target load even when the resistance of the third conductive path is high. On the other hand, when the temperature of the power storage unit is low, the internal resistance of the power storage unit is high. Thus, the power storage unit needs to have a capacity sufficient for generating the target voltage even when the internal resistance is high.

Under the above circumstances, a configuration is adopted in which, when the temperature of the power storage unit is within the predetermined first temperature range, the control unit sets the target voltage to the first target voltage, and when the temperature of the power storage unit is within the predetermined second temperature range that is higher than the first temperature range, the control unit sets the target voltage to the second target voltage that is higher than the first target voltage. In addition, it is envisioned that, when the temperature of the power storage unit is relatively low, the temperature of the third conductive path is also relatively low, and when the temperature of the power storage unit is relatively high, the temperature of the third conductive path is also relatively high.

Therefore, when the temperatures of the power storage unit and the third conductive path are relatively low, the internal resistance of the power storage unit is relatively high, but the target voltage is set to the first target voltage that is relatively low, and thus it is possible to mitigate the burden on the power storage unit while suppressing excessive supply of power to the backup target load. Conversely, when the temperatures of the power storage unit and the third conductive path are relatively high, the resistance of the third conductive path is relatively high, but the internal resistance of the power storage unit is low, and thus, it is possible to supply drive power to the backup target load while suppressing an increase in the capacity of the power storage unit by setting the target voltage to the second target voltage that is relatively high. Therefore, it is possible to effectively suppress an increase in the capacity of the power storage unit.

In the above-described in-vehicle backup power source control apparatus according to the second aspect, the control unit controls the voltage conversion operation such that the output voltage that is applied to the second conductive path by the voltage conversion unit reaches the target voltage. It is necessary to determine the target voltage at this time in anticipation of power loss due to the resistance of the third conductive path that connects the second conductive path and the backup target load. In particular, when the temperature of the third conductive path is high, the resistance of the third conductive path is high, and thus it is necessary to determine the target voltage so as to supply power required for driving the backup target load, to the backup target load even when the resistance of the third conductive path is high. On the other hand, when the temperature of the power storage unit is low, the internal resistance of the power storage unit is high. Thus, the power storage unit needs to have a capacity sufficient for generating the target voltage even when the internal resistance is high.

Under the above circumstances, a configuration is adopted in which the higher the temperature of the power storage unit is, the higher the target voltage the control unit sets. In addition, it is envisioned that, when the temperature of the power storage unit is relatively low, the temperature of the third conductive path is also relatively low, and when the temperature of the power storage unit is relatively high, the temperature of the third conductive path is also relatively high.

Therefore, when the temperatures of the power storage unit and the third conductive path are relatively low, the internal resistance of the power storage unit is relatively high, but the target voltage is set to a relatively low target voltage, and thus it is possible to mitigate the burden on the power storage unit while suppressing excessive supply of power to the backup target load. Conversely, when the temperatures of the power storage unit and the third conductive path are relatively high, the resistance of the third conductive path is relatively high, but the internal resistance of the power storage unit is low, and thus it is possible to supply drive power to the backup target load while suppressing an increase in the capacity of the power storage unit, by setting the target voltage to a relatively high target voltage. Therefore, it is possible to effectively suppress an increase in the capacity of the power storage unit.

In the above-described in-vehicle backup power source control apparatus according to the third aspect, the control unit controls the voltage conversion operation such that the output voltage that is applied to the second conductive path by the voltage conversion unit reaches the target voltage. It is necessary to determine the target voltage at this time in anticipation of power loss due to the resistance of the third conductive path that connects the second conductive path and the backup target load. In particular, when the temperature of the third conductive path is high, the resistance of the third conductive path is high, and thus, it is necessary to determine the target voltage so as to supply power required for driving the backup target load, to the backup target load even when the resistance of the third conductive path is high. On the other hand, when the temperature of the power storage unit is low, the internal resistance of the power storage unit is high. Thus, the power storage unit needs to have a capacity sufficient for generating the target voltage even when the internal resistance is high.

Under the above circumstances, a configuration is adopted in which, when the temperature of the third conductive path is within the predetermined first temperature range, the control unit sets the target voltage to the first target voltage, and when the temperature of the third conductive path is within the predetermined second temperature range that is lower than the first temperature range, the control unit sets the target voltage to the second target voltage that is higher than the first target voltage. In addition, it is envisioned that, when the temperature of the third conductive path is relatively low, the temperature of the power storage unit is also relatively low, and when the temperature of the third conductive path is relatively high, the temperature of the power storage unit is also relatively high.

Therefore, when the temperatures of the power storage unit and the third conductive path are relatively low, the internal resistance of the power storage unit is relatively high, but the target voltage is set to the first target voltage that is relatively low, and thus it is possible to mitigate the burden on the power storage unit while suppressing excessive supply of power to the backup target load. Conversely, when the temperatures of the power storage unit and the third conductive path are relatively high, the resistance of the third conductive path is relatively high, but the internal resistance of the power storage unit is low, and thus, it is possible to supply drive power to the backup target load while suppressing an increase in the capacity of the power storage unit by setting the target voltage to the second target voltage that is relatively high. Therefore, it is possible to effectively suppress an increase in the capacity of the power storage unit.

In the above-described in-vehicle backup power source control apparatus according to the fourth aspect, the control unit controls the control voltage conversion operation such that the output voltage that is applied to the second conductive path by the voltage conversion unit reaches the target voltage. It is necessary to determine the target voltage at this time in anticipation of power loss due to the resistance of the third conductive path that connects the second conductive path and the backup target load. In particular, when the temperature of the third conductive path is high, the resistance of the third conductive path is high, and thus it is necessary to determine the target voltage so as to supply power required for driving the backup target load, to the backup target load even when the resistance of the third conductive path is high. On the other hand, when the temperature of the power storage unit is low, the internal resistance of the power storage unit is high. Thus, the power storage unit needs to have a capacity sufficient for generating the target voltage even when the internal resistance is high.

Under the above circumstances, a configuration is adopted in which, the higher the temperature of the third conductive path is, the higher the target voltage the control unit sets. In addition, it is envisioned that, when the temperature of the third conductive path is relatively low, the temperature of the power storage unit is also relatively low, and when the temperature of the third conductive path is relatively high, the temperature of the power storage unit is also relatively high.

Therefore, when the temperatures of the power storage unit and the third conductive path are relatively low, the internal resistance of the power storage unit is relatively high, but the target voltage is set to a relatively low target voltage, and thus it is possible to mitigate the burden on the power storage unit while suppressing excessive supply of power to the backup target load. Conversely, when the temperatures of the power storage unit and the third conductive path are relatively high, the resistance of the third conductive path is relatively high, but the internal resistance of the power storage unit is low, and thus it is possible to supply drive power to the backup target load while suppressing an increase in the capacity of the power storage unit by setting the target voltage to a relatively high target voltage. Therefore, it is possible to effectively suppress an increase in the capacity of the power storage unit.

According to the above-described in-vehicle backup power source apparatus, it is possible to achieve the same effects as the in-vehicle backup power source control apparatus according to first to fourth aspects.

DETAILED DESCRIPTION OF PREFERRED EMBODIMENTS

Here, desirable examples of the present disclosure will be described. However, the present disclosure is not limited to the following examples.

In the above-described in-vehicle backup power source control apparatus according to the third or fourth aspect, the temperature obtaining unit may obtain the temperature of a wire harness that constitutes the third conductive path and serves as a power supply path extending from a substrate on which the voltage conversion unit is implemented to the backup target load.

This makes it possible to obtain the temperature of a portion of the third conductive path separated from the substrate on which the voltage conversion unit that is likely to generate heat is implemented. In other words, it is possible to obtain the temperature of a portion that is unlikely to be affected by heat generated by the voltage conversion unit, and thus it is possible to obtain a more accurate temperature of the third conductive path. As a result, it is possible to more accurately determine a target voltage suitable for the temperature of the third conductive path and the power storage unit.

Embodiments of the present disclosure will be described below.

First Embodiment

Figure 1:
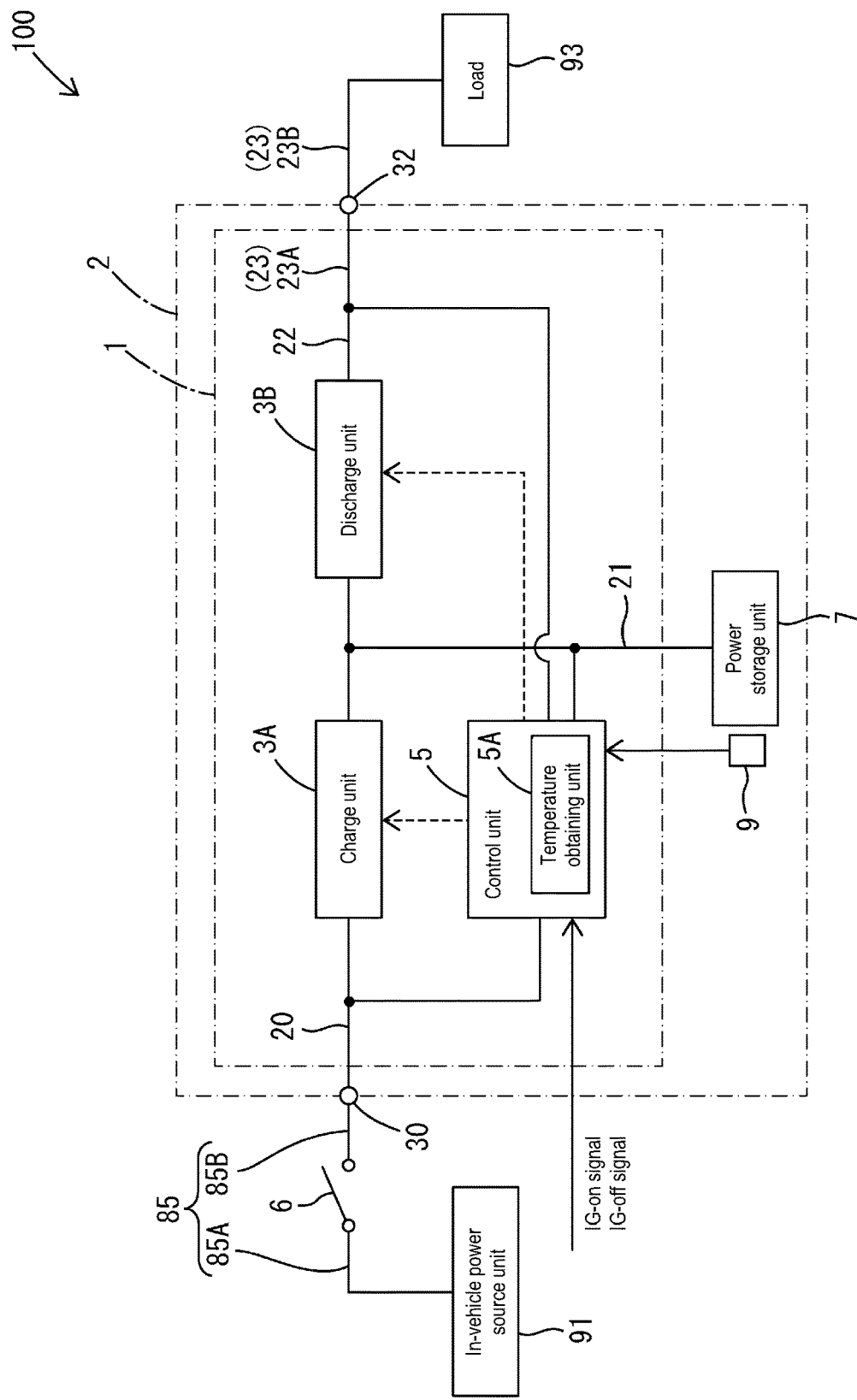
FIG. 1 is a circuit diagram schematically showing an in-vehicle power source system that includes a backup power source control apparatus according to a first embodiment.

FIG. 1 is a block diagram showing an in-vehicle power source system 100 that includes an in-vehicle backup power source control apparatus 1 (hereinafter, also referred to as "backup power source control apparatus 1") according to a first embodiment. The in-vehicle power source system 100 includes an in-vehicle power source unit 91 that serves as a main power source for supplying power to a backup target load 93, a power storage unit 7 that serves as a power supply source when power supply from at least the in-vehicle power source unit 91 stops, a temperature detection unit 9 that detects the temperature of the power storage unit 7, and the backup power source control apparatus 1 that has a function of promptly discharging the power storage unit 7 when power supply from the in-vehicle power source unit 91 stops, and the in-vehicle power source system 100 is configured as a system that supplies power to the backup target load 93, using the in-vehicle power source unit 91 or the power storage unit 7 as a power supply source.

This in-vehicle power source system 100 is configured to supply power from the in-vehicle power source unit 91 to the backup target load 93 via a wire portion (not illustrated)

when power supply from the in-vehicle power source unit 91 is in a normal state. In this configuration, "when power supply from the in-vehicle power source unit 91 is in a normal state" refers to a case where the output voltage of the in-vehicle power source unit 91 exceeds a "predetermined value", specifically a case where a voltage that is applied to a conductive path 20 based on the output voltage of the in-vehicle power source unit 91 (specifically, a voltage applied to the conductive path 20 based on the power supplied from the in-vehicle power source unit 91 via a wire portion 85) exceeds a "predetermined value".

The backup power source control apparatus 1 is an apparatus that uses the power storage unit 7 that is charged based on power supply from the in-vehicle power source unit 91, as a backup power source, and controls a discharge operation of the power storage unit 7. This backup power source control apparatus 1 includes a discharge unit 3B, and has a configuration in which a switch is made between discharge and discharge stop of the power storage unit 7 using the discharge unit 3B, and power from the power storage unit 7 can be supplied to the backup target load 93 during discharge. In addition, an in-vehicle backup power source apparatus 2 is configured to include the backup power source control apparatus 1, the power storage unit 7, and the temperature detection unit 9.

The in-vehicle power source unit 91 is configured as a known in-vehicle battery such as a lead battery. The high-potential terminal of the in-vehicle power source unit 91 is electrically connected to the wire portion 85, and applies a predetermined output voltage (hereinafter, also referred to as "+B voltage") to the wire portion 85.

One end of the wire portion 85 is electrically connected to the high-potential terminal of the in-vehicle power source unit 91, and the other end is electrically connected to an input terminal 30 of the in-vehicle backup power source apparatus 2. The wire portion 85 includes a wire portion 85A and a wire portion 85B, and an ignition relay 6 (hereinafter, also referred to as "IG relay 6") is provided between the wire portion 85A and the wire portion 85B.

The wire portion 85A is electrically connected to the high-potential terminal of the in-vehicle power source unit 91 and one end of the IG relay 6. The wire portion 85B is electrically connected to the other end of the IG relay 6 and the input terminal 30. The conductive path 20 of the backup power source apparatus 2 is electrically connected to the input terminal 30. Thus, the wire portion 85B (the wire portion 85) is electrically connected to the conductive path 20 via the input terminal 30.

The IG relay 6 is a relay that is switched to an on-state when a predetermined start operation (ignition-on operation (IG on operation)) for starting the engine is performed on an operation unit (not illustrated) provided in the vehicle, and is switched to an off-state when a predetermined stop operation (ignition-off operation (IG off operation)) for stopping the engine is performed. In the on-state, this IG relay 6 is in a conductive state, and the wire portion 85A and the wire portion 85B are conductively connected. As a result of such an on operation of the IG relay 6 being performed, the power source voltage (+B voltage) of the in-vehicle power source unit 91 is supplied to the conductive path 20. In the off-state, the IG relay 6 is in a non-conductive state, and, at this time, the power source voltage (+B voltage) applied to the wire portion 85 (the wire portion 85A) is not supplied to the conductive path 20. Note that, in the following description, the power source voltage (+B voltage) applied to the conductive path 20 via the IG relay 6 is also referred to as an "IG voltage".

The power storage unit 7 is constituted by a known power storage means such as an electric double layer capacitor (EDLC). The power storage unit 7 is electrically connected to a charge unit 3A, and is charged by the charge unit 3A. Also, the power storage unit 7 is electrically connected to the discharge unit 3B, and is discharged by the discharge unit 3B. Note that, according to the first embodiment, the voltage of the power storage unit 7 when fully charged is higher than the voltage of the in-vehicle power source unit 91 when fully charged.

The backup target load 93 (hereinafter, also referred to as "load 93") is configured as a known in-vehicle electrical component. A preferred example of the load 93 is an electrical component in which power supply is desired even when the in-vehicle power source unit 91 has a failure, such as an ECU or an actuator in a shift-by-wire system. In the above normal state, the load 93 operates based on the power supplied from the in-vehicle power source unit 91, and, in an abnormal state, the load 93 operates based on the power supplied from the power storage unit 7 via a second conductive path 22 and a third conductive path 23.

The third conductive path 23 is a conductive path that constitutes, along with the second conductive path 22, a path for a current to flow from the discharge unit 3B to the load 93. One end of the third conductive path 23 is electrically connected to the load 93, and the other end is electrically connected to the second conductive path 22. The third conductive path 23 includes a substrate-side conductive path 23A and a wire harness 23B. The substrate-side conductive path 23A is configured as, for example, a wiring pattern or a metal layer provided on the substrate on which the discharge unit 3B (voltage conversion unit) and the like are implemented, and one end of the substrate-side conductive path 23A is electrically connected to the second conductive path 22, and the other end is connected to an output terminal 32 of the backup power source apparatus 2. The wire harness 23B is configured as a power supply path extending from the substrate on which the discharge unit 3B (voltage conversion unit) and the like are implemented to the load 93, for example, and one end of the wire harness 23B is connected to the output terminal 32, and the other end is electrically connected to the load 93. Accordingly, as a result of being connected to the output terminal 32, the wire harness 23B is electrically connected to the substrate-side conductive path 23A.

The temperature detection unit 9 is configured as a known temperature sensor such as a thermistor, and is configured to output a voltage value indicating the temperature at the position at which this temperature detection unit 9 is disposed, to a temperature obtaining unit 5A of a control unit 5 to be described later. The temperature detection unit 9 is fixed to be in contact with a surface portion of the power storage unit 7, for example, and outputs a value indicating the temperature of the surface portion of the power storage unit 7 (outer-face temperature), as a detected value. Note that it suffices for the temperature detection unit 9 to be disposed at a position where a change in the temperature of the power storage unit 7 can be detected, and the temperature detection unit 9 does not need to be in contact with the power storage unit 7. The temperature detection unit 9 may also be implemented on a substrate on which the power storage unit 7 is implemented in the vicinity of the power storage unit 7, for example.

The backup power source control apparatus 1 mainly includes the conductive path 20, a first conductive path 21, the second conductive path 22, the charge unit 3A, the discharge unit 3B, the control unit 5, and the like.

The conductive path 20 is a conductive path that is conductively connected to the wire portion 85 during an on-operation (during a conducting operation) of the IG relay 6, and is a conductive path on the input side of the charge unit 3A.

The first conductive path 21 is a conductive path that is electrically connected to the power storage unit 7, and serves as a charging path extending from the charge unit 3A to the power storage unit 7 and a discharging path extending from the power storage unit 7 to the discharge unit 3B.

The second conductive path 22 is a conductive path that constitutes, along with the third conductive path 23, a path for supplying power from the discharge unit 3B to the load 93.

The charge unit 3A is configured as a known charging circuit, for example, and can perform a charge operation for charging the power storage unit 7 based on the power from the in-vehicle power source unit 91, and a charge stop operation for stopping charging of the power storage unit 7. The charge operation performed by the charge unit 3A is controlled by the control unit 5.

A charge instruction signal instructing that the power storage unit 7 be charged or a charge stop signal instructing that charging of the power storage unit 7 be stopped is supplied to the charge unit 3A by the control unit 5. The charge unit 3A is configured as a known charging circuit such as a step-up DC-DC converter, and, when the charge instruction signal is supplied from the control unit 5 to the charge unit 3A, the charge unit 3A performs a voltage conversion operation for stepping up the power source voltage input from the in-vehicle power source unit 91 via the conductive path 20, and applies the stepped-up voltage to the power storage unit 7 via the first conductive path 21. When the charge stop signal is supplied from the control unit 5, the charge unit 3A stops the charge operation, and a non-conductive state is achieved between the conductive path 20 and the first conductive path 21.

The discharge unit 3B corresponds to an example of a voltage conversion unit, and is configured as a discharging circuit such as a step-up/step-down DC-DC converter. The discharge unit 3B can perform a discharge operation for discharging the power storage unit 7 based on the power from the in-vehicle power source unit 91 and a discharge stop operation for stopping discharging of the power storage unit 7. The discharge operation performed by the discharge unit 3B is controlled by the control unit 5.

When a discharge instruction signal is supplied from the control unit 5, the discharge unit 3B performs a discharge operation for outputting a target voltage determined for the second conductive path 22 (specifically, a discharge operation for applying a target voltage instructed by the control unit 5, to the second conductive path 22) based on an input voltage (output voltage from the power storage unit 7) applied to the first conductive path 21, and, when a discharge stop signal is supplied from the control unit 5, the discharge unit 3B stops this discharge operation, and a non-conductive state is achieved between the first conductive path 21 and the second conductive path 22. Accordingly, the discharge unit 3B can step up or down the voltage applied to the first conductive path 21, and perform a discharge operation (voltage conversion operation) for applying an output voltage to the second conductive path 22.

The control unit 5 is configured as a microcomputer, for example, and includes a computation apparatus such as a CPU, a memory such as a ROM or RAM, an A/D converter, and the like. A configuration is adopted in which the voltage of the conductive path 20 (in other words, the output voltage value of the in-vehicle power source unit 91) is input to the control unit 5, and the control unit 5 can continuously monitor the voltage of the conductive path 20. Note that the configuration shown in FIG. 1 is merely exemplary, and any configuration in which the control unit 5 can detect the output voltage of the in-vehicle power source unit 91 may be adopted, and a voltage at another position may also be monitored if the position is on a path that is electrically connected to the in-vehicle power source unit 91.

In addition, a configuration is adopted in which the voltage of the first conductive path 21 (in other words, the output voltage (charging voltage) of the power storage unit 7) is input to the control unit 5, and the control unit 5 can continuously monitor the voltage of the first conductive path 21.

A configuration is adopted in which the voltage of the second conductive path 22 (in other words, the output voltage value of the discharge unit 3B) is input to the control unit 5, and the control unit 5 can continuously monitor the voltage of the second conductive path 22.

In addition, the control unit 5 includes the temperature obtaining unit 5A that obtains the temperature of the power storage unit 7. A configuration is adopted in which the temperature detected by the temperature detection unit 9 (in other words, the temperature of the power storage unit 7) is input to the temperature obtaining unit 5A, and the control unit 5 can continuously monitor the temperature detected by the temperature detection unit 9.

Note that the configuration in which a value indicating the voltage of each path is input to the control unit 5 may also be a configuration in which the voltage of each path is directly input to the control unit 5 as shown in FIG. 1, or a voltage obtained by dividing the voltage of each path using a voltage-dividing circuit or the like may also be input to the control unit 5.

In addition, an IG-on signal indicating that the ignition switch is in the on-state and an IG-off signal indicating that the ignition switch is in the off-state are input from an external apparatus (not illustrated) to the control unit 5. Accordingly, the control unit 5 can determine whether or not the ignition switch is in the on-state.

The control unit 5 can control the charge operation made by the charge unit 3A and the discharge operation made by the discharge unit 3B. Specifically, the control unit 5 can supply the charge instruction signal or charge stop signal to the charge unit 3A, and supply the discharge instruction signal or discharge stop signal to the discharge unit 3B. The control unit 5 can control the discharge operation (voltage conversion operation) such that the output voltage that is applied to the second conductive path 22 by the discharge unit 3B reaches the target voltage, by supplying the discharge instruction signal to the discharge unit 3B.

Next, operations of the backup power source control apparatus 1 will be described.

When an IG-on operation corresponding to an example of a vehicle start operation (on-operation for on-operating the ignition switch corresponding to an example of a start switch) is performed in the vehicle in which the in-vehicle power source system 100 is mounted, the IG relay 6 is switched from the off-state to the on-state, and the wire portion 85 and the conductive path 20 are conductively connected. Accordingly, the IG voltage is applied to the backup power source control apparatus 1.

For at least a period of time from when the ignition switch enters the on-state until when it enters the off-state, the control unit 5 monitors the output voltage of the in-vehicle power source unit 91 by monitoring the voltage of the conductive path 20. In the backup power source control apparatus 1, a predetermined threshold value Vth is determined, and the control unit 5 continuously monitors whether or not the voltage of the conductive path 20 (in other words, the output voltage of the in-vehicle power source unit 91) is higher than the threshold value Vth. Note that the "predetermined threshold value Vth" is a value higher than 0 V and lower than the voltage of the in-vehicle power source unit 91 when fully charged.

The charge operation by the charge unit 3A is executed at a predetermined charge start time (for example, immediately after the ignition switch enters the on-state) if the voltage of the conductive path 20 (in other words, the output voltage of the in-vehicle power source unit 91) is higher than the threshold value Vth, and the charge instruction signal is supplied from the control unit 5 to the charge unit 3A until the output voltage (charging voltage) of the power storage unit 7 reaches a predetermined target value. In this configuration, after the charge operation is started at the predetermined charge start time and the output voltage (charging voltage) of the power storage unit 7 reaches the predetermined target value, the output voltage (charging voltage) of the power storage unit 7 is kept at the predetermined target value (the output voltage when the power storage unit 7 is fully charged) until a predetermined discharge start time (when the discharge operation is started by the discharge unit 3B).

Note that the "predetermined target value" is a value determined in advance as a target value of the power storage unit 7 when the IG relay 6 is on-operating, and when the IG relay 6 is off-operating, the output voltage of the power storage unit 7 is suppressed to a level that is lower than the above target value.

Here, a case will be described in which power supply from the in-vehicle power source unit 91 is in the normal state.

When the ignition switch is in the on-state (when the IG relay 6 is in the on-state), and the voltage of the conductive path 20 (output voltage of the in-vehicle power source unit 91) is higher than the threshold value Vth, it can be said that power supply from the in-vehicle power source unit 91 is proper. When the IG relay 6 is in the on-state, and the voltage of the conductive path 20 (output voltage of the in-vehicle power source unit 91) is higher than the threshold value Vth, the control unit 5 keeps the discharge unit 3B in a discharge stop state, and shuts off conductivity between the first conductive path 21 and the second conductive path 22.

Next, operations when the ignition switch is in the on-state and the state changes from the normal state to an abnormal state will be described.

If an abnormality in power supply from the in-vehicle power source unit 91 (for example, the occurrence of an earth fault or breaking of a wire in the vicinity of the in-vehicle power source unit 91) occurs when the ignition switch is in the on-state (in other words, when the IG relay 6 is in the on-state), and power supply from the in-vehicle power source unit 91 to the conductive path 20 is suspended, the voltage (+B voltage) applied to the conductive path 20 changes from a value that is higher than the threshold value Vth to a value that is lower than or equal to the threshold value Vth. When power supply from the in-vehicle power source unit 91 to the conductive path 20 stops in this manner (specifically, when the voltage of the conductive path 20 falls below the threshold value Vth), the control unit 5 starts backup processing shown in FIG. 2. The control unit 5 performs backup control such that the voltage that is applied to the second conductive path 22 reaches the predetermined target voltage, by supplying the discharge instruction signal to the discharge unit 3B in backup processing.

Incidentally, in this in-vehicle power source system 100, a voltage adjusted by the discharge unit 3B to the target voltage is supplied to the load 93 via the third conductive path 23. Thus, it is necessary to determine the target voltage in anticipation of an occurrence of power loss due to the resistance of the third conductive path 23. In particular, when the temperature of the third conductive path 23 is high, the resistance of the third conductive path 23 is high, and thus, it is necessary to determine the target voltage so as to supply power required for driving the load 93 to driving the load 93 even when the resistance of the third conductive path 23 is high. On the other hand, when the temperature of the power storage unit 7 is low, the internal resistance of the power storage unit 7 is high. Thus, the power storage unit 7 needs to have a capacity sufficient for generating the target voltage even when the internal resistance is high. In view of this, the in-vehicle power source system 100 performs backup processing in the following manner so as to appropriately supply power to the load 93, while effectively suppressing an increase in the capacity of the power storage unit 7.

Figure 2:
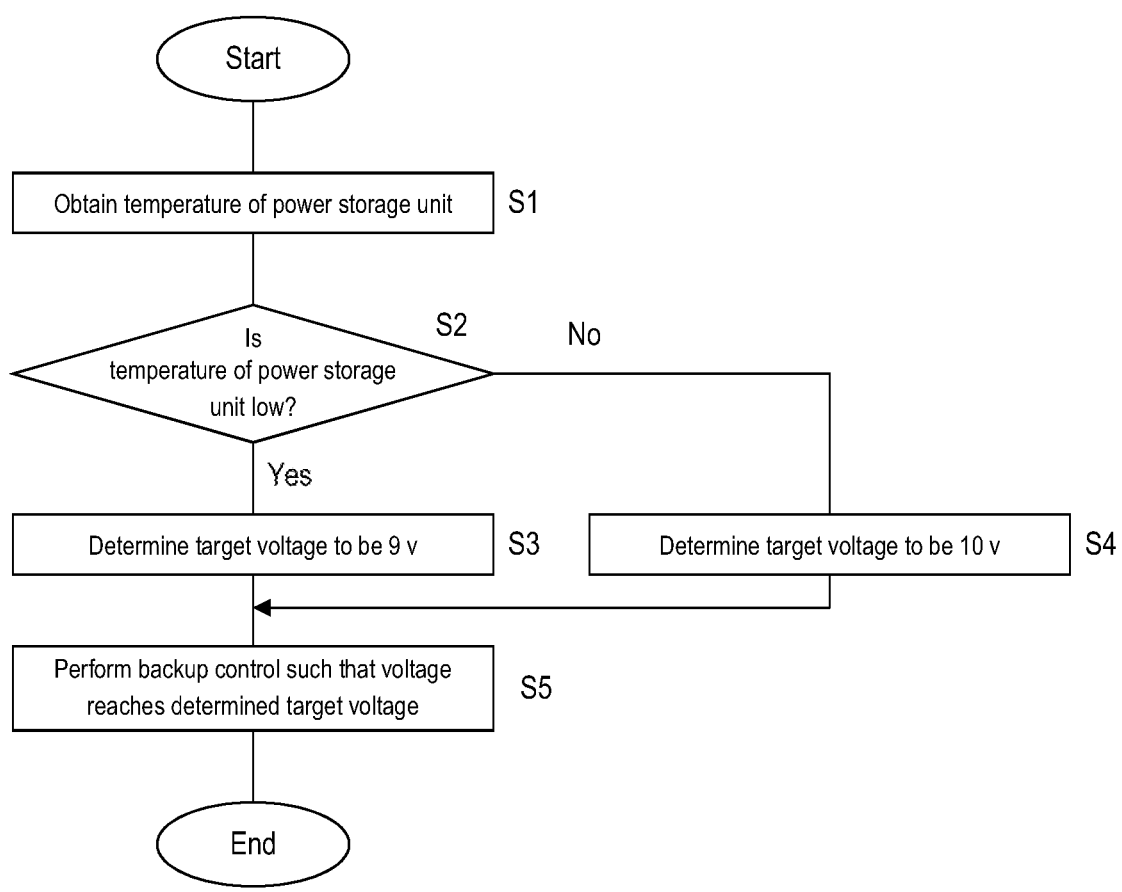
FIG. 2 is a flowchart showing a flow of backup processing according to the first embodiment.

When a predetermined backup start condition is met (for example, when the voltage of the conductive path 20 falls below the threshold value Vth), the control unit 5 starts the backup processing shown in FIG. 2. First, in step S1, the control unit 5 obtains the temperature of the power storage unit 7. Specifically, the temperature detected by the temperature detection unit 9 is obtained by the temperature obtaining unit 5A. Subsequently, in step S2, a determination is performed as to whether or not the temperature of the power storage unit 7 obtained in step S1 is a low temperature. The "low temperature" is preferably a temperature that is low to a degree where the internal resistance of the power storage unit 7 is high compared with the case of an ordinary temperature, and is preferably within a temperature range lower than a predetermined threshold temperature (for example, −10° C.).

If it is determined that the temperature of the power storage unit 7 is a low temperature (step S2: YES), the target voltage is determined to be 9 V in step S3. In contrast, if it is determined that the temperature of the power storage unit 7 is not a low temperature (step S2: NO), the target voltage is determined to be 10 V in step S4.

Note that a "low temperature (temperature range lower than a threshold temperature range)" corresponds to an example of a temperature within a first temperature range, and a "range of temperatures that are not low temperatures (temperature range that is higher than or equal to the threshold temperature range)" corresponds to an example of a temperature within a second temperature range that is higher than the first temperature range (more specifically, a temperature within a predetermined second temperature range whose lower-limit temperature is higher than the upper limit temperature of the first temperature range). In addition, the target voltage (9 V) that is determined if it is determined that the temperature of the power storage unit 7 is a low temperature corresponds to an example of a first target voltage, and the target voltage (10 V) that is determined if it is determined that the temperature of the power storage unit 7 is not a low temperature corresponds to an example of a second target voltage that is higher than the first target voltage.

After a target voltage is determined in step S3 or S4, the control unit 5 performs backup control such that the voltage that is applied to the second conductive path 22 by the discharge unit 3B reaches the target voltage, in step S5. Specifically, the control unit 5 switches a signal that is supplied to the discharge unit 3B from the discharge stop signal to the discharge instruction signal, and causes the discharge unit 3B to perform a discharge operation so as to apply the target voltage determined in step S3 or step S4 to the second conductive path 22.

In this configuration, the discharge unit 3B is configured as a step-up/step-down DC-DC converter that uses, as an input voltage, the voltage applied to the first conductive path 21, and outputs a desired voltage to the second conductive path 22, and when the output voltage (charging voltage) of the power storage unit 7 that is applied to the first conductive path 21 is lower than a predetermined target voltage, the control unit 5 causes the discharge unit 3B to perform a step-up operation, and causes the discharge unit 3B to apply the predetermined target voltage to the second conductive path 22. In addition, when the output voltage (charging voltage) of the power storage unit 7 that is applied to the first conductive path 21 is higher than the predetermined target voltage, the control unit 5 causes the discharge unit 3B to perform a step-down operation, and causes the discharge unit 3B to apply the target voltage to the second conductive path 22.

Next, effects of this configuration will be illustrated.

The control unit 5 of the backup power source control apparatus 1 according to the first embodiment controls the voltage conversion operation such that the output voltage that is applied to the second conductive path 22 by the discharge unit 3B reaches a target voltage. The target voltage at this time needs to be determined in anticipation of power loss due to the resistance of the third conductive path 23 that connects the second conductive path 22 and the load 93. In particular, when the temperature of the third conductive path 23 is high, the resistance of the third conductive path 23 is high, and thus it is necessary to determine the target voltage so as to supply power required for driving the backup target load 93 to the backup target load 93 even when the resistance of the third conductive path 23 is high. On the other hand, when the temperature of the power storage unit 7 is low, the internal resistance of the power storage unit 7 is high. Thus, the power storage unit 7 needs to have a capacity sufficient for generating the target voltage even when the internal resistance is high.

Under the above circumstances, a configuration is adopted in which, when the temperature of the power storage unit 7 is within the predetermined first temperature range (a low temperature), the control unit 5 sets the target voltage to the first target voltage (9 V), and when the temperature of the power storage unit 7 is within the predetermined second temperature range that is higher than the first temperature range (not a low temperature), the control unit 5 sets the target voltage to the second target voltage (10 V) that is higher than the first target voltage. In addition, it is envisioned that, when the temperature of the power storage unit 7 is relatively low, the temperature of the third conductive path 23 is also relatively low, and when the temperature of the power storage unit 7 is relatively high, the temperature of the third conductive path 23 is also relatively high.

Therefore, when the temperatures of the power storage unit 7 and the third conductive path 23 are relatively low, the internal resistance of the power storage unit 7 is relatively high, but the target voltage is set to the first target voltage that is relatively low, and thus it is possible to mitigate the burden on the power storage unit 7 while suppressing excessive supply of power to the backup target load 93.

Conversely, when the temperatures of the power storage unit 7 and the third conductive path 23 are relatively high, the resistance of the third conductive path 23 is relatively high, but the internal resistance of the power storage unit 7 is low, and thus it is possible to supply drive power to the backup target load 93 while suppressing an increase in the capacity of the power storage unit 7, by setting the target voltage to the second target voltage that is relatively high. Therefore, it is possible to effectively suppress an increase in the capacity of the power storage unit 7.

Second Embodiment

Next, an in-vehicle power source system 100 according to a second embodiment will be described.

The in-vehicle power source system 100 according to the second embodiment is different from the first embodiment in the flow of backup processing that is performed by the control unit 5 of the backup power source control apparatus 1, but the first and second embodiments are otherwise similar. The hardware configuration of the second embodiment is similar to that in FIG. 1, for example.

Figure 3:
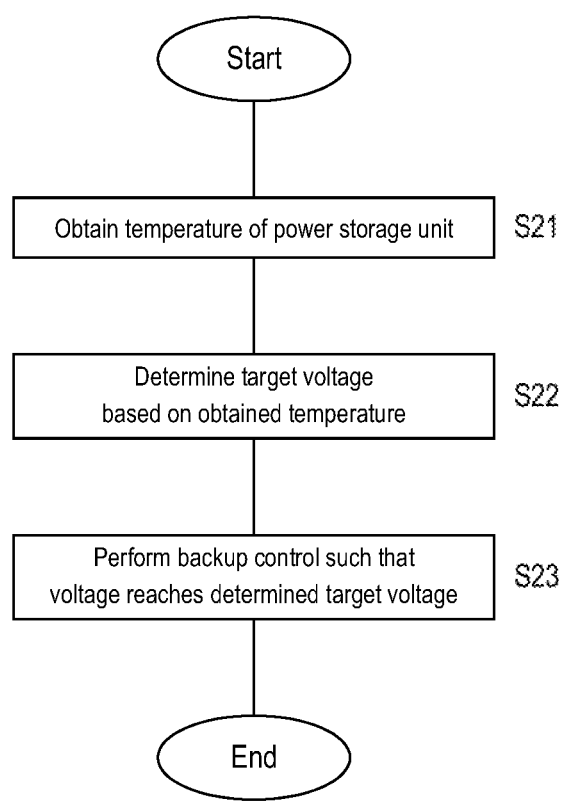
FIG. 3 is a flowchart showing a flow of backup processing according to a second embodiment.

When a predetermined backup start condition is met (for example, when the voltage of the conductive path 20 falls below the threshold value Vth), the control unit 5 of the backup power source control apparatus 1 according to the second embodiment starts the backup processing shown in FIG. 3. First, in step S21, the control unit 5 obtains the temperature of the power storage unit 7. Subsequently, in step S22, a target voltage is determined based on the obtained temperature. An equation for determining a target voltage based on a temperature is stored in advance, and a target voltage is determined based on this equation, for example.

The equation can be Expression 1 below, for example. Note that, A and B take values (fixed values) determined based on a specific configuration of the in-vehicle power source system 100, Vt indicates a target voltage [V], and Tr indicates the temperature of the power storage unit 7 (temperature obtained by the temperature obtaining unit 5A) [° C.].

$$Vt = A \times Tr + B \tag{1}$$

Alternatively, the equation may also be Expression 2 below. Note that A, B, and C take values (fixed values) determined based on a specific configuration of the in-vehicle power source system 100, Vt indicates a target voltage [V], and Tr indicates the temperature of the power storage unit 7 (temperature obtained by the temperature obtaining unit 5A) [° C.].

$$Vt = A \times Tr^2 + B \times Tr + C \tag{2}$$

Note that the equation is an equation for determining a larger target voltage (Vt) for a higher temperature of the power storage unit 7 (Tr).

The control unit 5 calculates Vt by substituting the temperature obtained in step S21 into Tr in the above equation, and determines calculated Vt to be a target voltage. At this time, the higher the temperature obtained by the temperature obtaining unit 5A is, the higher the target voltage the control unit 5 determines. After the target voltage is determined, backup control is performed in step S23 such that the voltage that is applied to the second conductive path 22 by the discharge unit 3B reaches the target voltage determined in step S22. The backup control is similar to the first embodiment, and thus a description thereof is omitted.

Next, effects of this configuration will be illustrated.

The control unit 5 of the in-vehicle backup power source control apparatus 1 according to the second embodiment controls the voltage conversion operation such that the output voltage that is applied to the second conductive path 22 by the discharge unit 3B reaches a target voltage. It is necessary to determine the target voltage at this time in anticipation of power loss due to the resistance of the third conductive path 23 that connects the second conductive path 22 and the load 93. In particular, when the temperature of the third conductive path 23 is high, the resistance of the third conductive path 23 is high, and thus it is necessary to determine the target voltage so as to supply power required for driving the load 93 to the load 93 even when the resistance of the third conductive path 23 is high. On the other hand, when the temperature of the power storage unit 7 is low, the internal resistance of the power storage unit 7 is high. Thus, the power storage unit 7 needs to have a capacity sufficient for generating the target voltage even when the internal resistance is high.

Under the above circumstances, a configuration is adopted in which the higher the temperature of the power storage unit 7 is, the higher the target voltage the control unit 5 determines. In addition, it is envisioned that, when the temperature of the power storage unit 7 is relatively low, the temperature of the third conductive path 23 is also relatively low, and, when the temperature of the power storage unit 7 is relatively high, the temperature of the third conductive path 23 is also relatively high.

Therefore, when the temperatures of the power storage unit 7 and the third conductive path 23 are relatively low, the internal resistance of the power storage unit 7 is relatively high, but the target voltage is set to a relatively low target voltage, and thus it is possible to mitigate the burden on the power storage unit 7 while suppressing excessive supply of power to the backup target load 93. Conversely, when the temperatures of the power storage unit 7 and the third conductive path 23 are relatively high, the resistance of the third conductive path 23 is relatively high, but the internal resistance of the power storage unit 7 is low, and thus it is possible to supply drive power to the backup target load 93 while suppressing an increase in the capacity of the power storage unit 7, by setting the target voltage to a relatively high target voltage. Therefore, it is possible to effectively suppress an increase in the capacity of the power storage unit 7.

Third Embodiment

Next, an in-vehicle power source system 300 according to a third embodiment will be described.

The in-vehicle power source system 300 according to the third embodiment is different from the first embodiment in that the backup power source control apparatus 1 determines a target voltage based on the temperature of the third conductive path 23 (the wire harness 23B) instead of the temperature of the power storage unit 7, and the first and third embodiments are otherwise similar. The in-vehicle power source system 300 according to the third embodiment is similar to the in-vehicle power source system 100 according to the first embodiment except that the temperature detection unit 9 detects the temperature of the third conductive path 23 (the wire harness 23B), and the temperature obtaining unit 5A of the control unit 5 obtains the temperature detected by the temperature detection unit 9 via an external ECU 395. The same reference numerals are assigned to portions of the in-vehicle power source system 300 that are similar to those of the in-vehicle power source system 100 according to the first embodiment, and a detailed description thereof is omitted.

Figure 4:
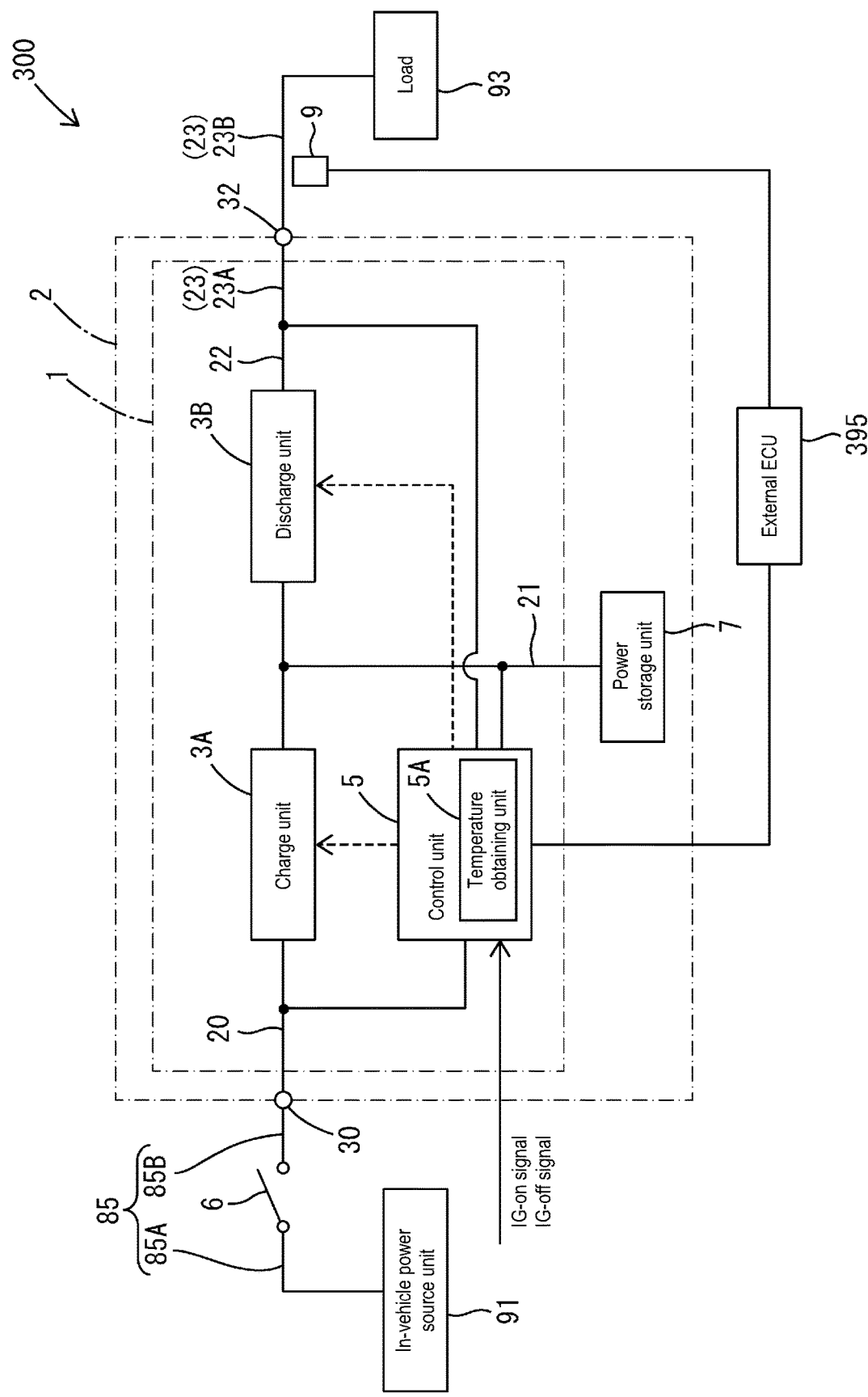
FIG. 4 is a circuit diagram schematically showing an in-vehicle power source system that includes a backup power source control apparatus according to a third embodiment.

As shown in FIG. 4, the in-vehicle power source system 300 includes the in-vehicle power source unit 91, the load 93, the power storage unit 7, the temperature detection unit 9, and the backup power source control apparatus 1 that are similar to the first embodiment, and is configured as a system that supplies power to the load 93 using the in-vehicle power source unit 91 or the power storage unit 7 as a power supply source. In addition, the in-vehicle backup power source apparatus 2 is configured to include the backup power source control apparatus 1 and the power storage unit 7.

The temperature detection unit 9 is fixed so as to be in contact with the surface portion of the third conductive path 23, for example, and outputs, as a detected value, a value indicating the temperature of the surface portion of the third conductive path 23 (outer-face temperature). The temperature detection unit 9 is preferably disposed at a position separated from the discharge unit 3B to an extent where the temperature detection unit 9 is not affected by heat generated by the discharge unit 3B. It is preferred that, for example, the temperature detection unit 9 is fixed so as to be in contact with the surface portion of the outer cover of the wire harness 23B, and detects the temperature of the wire harness 23B. This enables the temperature detection unit 9 to be unaffected by heat generated by the discharge unit 3B, and thus to more accurately detect the temperature of the third conductive path 23. Note that a configuration may also be adopted in which the temperature detection unit 9 detects the temperature of the substrate-side conductive path 23A. In addition, the temperature detection unit 9 does not need to be in direct contact with the third conductive path 23 if the temperature detection unit 9 can detect the temperature of the third conductive path 23, and may also be disposed on a substrate on which the discharge unit 3B is implemented, in the vicinity of the third conductive path 23, for example.

The in-vehicle power source system 300 further includes the external ECU 395, and temperature information indicating the temperature detected by the temperature detection unit 9 is output to the temperature obtaining unit 5A of the control unit 5 via the external ECU 395. Accordingly, the control unit 5 can obtain the temperature of the third conductive path 23.

Next, operations of the backup power source control apparatus 1 will be described.

Figure 5:
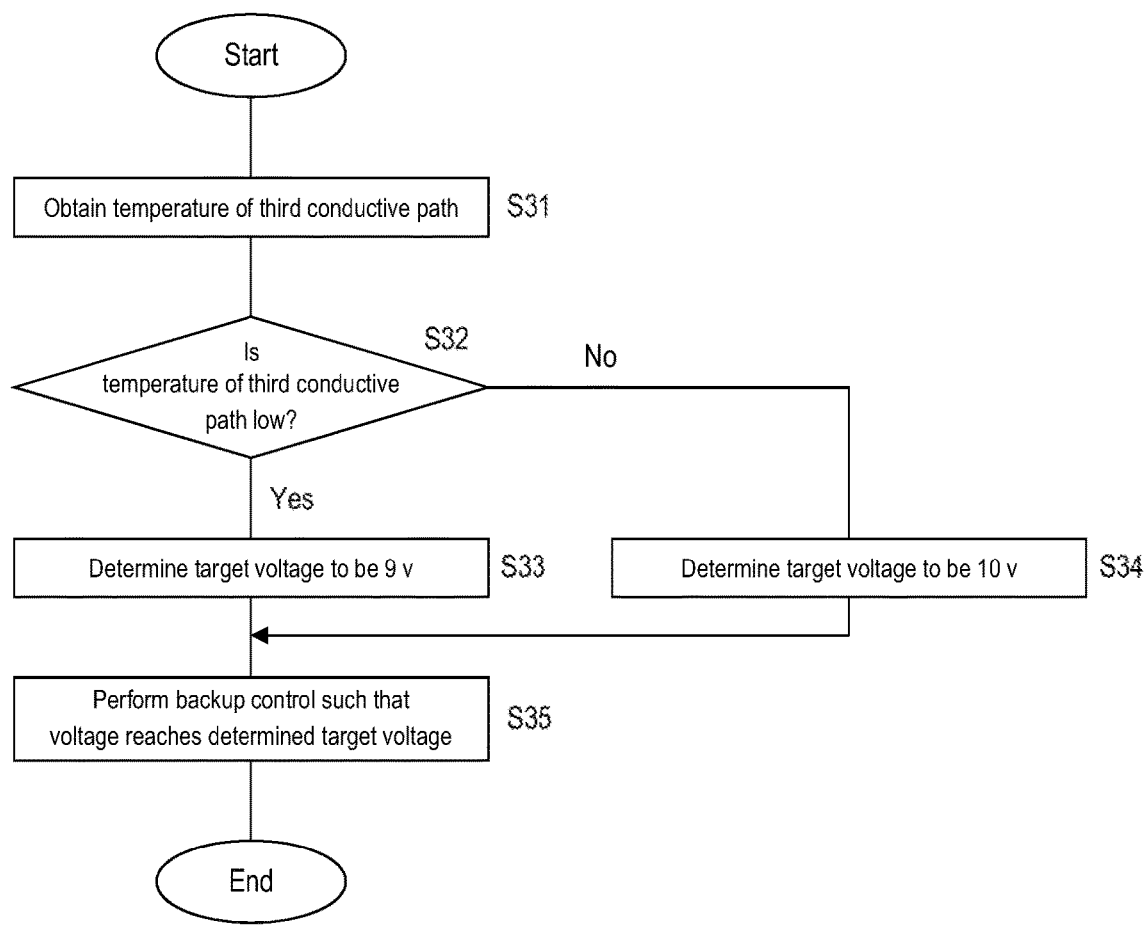
FIG. 5 is a flowchart showing a flow of backup processing according to the third embodiment.

When a predetermined backup start condition is met (for example, when the voltage of the conductive path 20 falls below the threshold value Vth), the control unit 5 starts the backup processing shown in FIG. 5. First, in step S31, the control unit 5 obtains the temperature of the third conductive path 23. Specifically, the temperature obtaining unit 5A obtains the temperature detected by the temperature detection unit 9. Subsequently, in step S32, a determination is performed as to whether or not the temperature of the third conductive path 23 obtained in step S31 is a low temperature. The "low temperature" is preferably a temperature that is low to a degree where the internal resistance of the power storage unit 7 is high compared with the case of an ordinary temperature, and is preferably within a temperature range lower than a predetermined threshold temperature (for example, −10° C.).

If it is determined that the temperature of the third conductive path 23 is a low temperature (step S32: YES), the target voltage is determined to be 9 V in step S33. In contrast, if it is determined that the temperature of the third conductive path 23 is not a low temperature (step S32: NO), the target voltage is determined to be 10 V in step S34.

Note that a "low temperature (temperature range lower than a threshold temperature range)" corresponds to an example of a temperature within a first temperature range, and a "range of temperatures that are not low temperatures (temperature range that is higher than or equal to the threshold temperature range)" corresponds to an example of a temperature within a second temperature range that is higher than the first temperature range (more specifically, a temperature within a predetermined second temperature range whose lower-limit temperature is higher than the upper limit temperature of the first temperature range). In addition, the target voltage (9 V) that is determined if it is determined that the temperature of the third conductive path 23 is a low temperature corresponds to an example of a first target voltage, and the target voltage (10 V) that is determined if it is determined that the temperature of the third conductive path 23 is not a low temperature corresponds to an example of a second target voltage that is higher than the first target voltage.

After a target voltage is determined in step S33 or step S34, the control unit 5 performs backup control such that the voltage that is applied to the second conductive path 22 by the discharge unit 3B reaches the target voltage determined in step S33 or step S34, in step S35. The backup control is similar to the first embodiment, and thus a description thereof is omitted.

Next, effects of this configuration will be illustrated.

The control unit 5 of the in-vehicle backup power source control apparatus 1 according to the third embodiment controls the voltage conversion operation such that the output voltage that is applied to the second conductive path 22 by the discharge unit 3B reaches a target voltage. It is necessary to determine the target voltage at this time in anticipation of power loss due to the resistance of the third conductive path 23 that connects the second conductive path 22 and the load 93. In particular, when the temperature of the third conductive path 23 is high, the resistance of the third conductive path 23 is high, and thus it is necessary to determine the target voltage so as to supply power required for driving the load 93 to the load 93 even when the resistance of the third conductive path 23 is high. On the other hand, when the temperature of the power storage unit 7 is low, the internal resistance of the power storage unit 7 is high. Thus, the power storage unit 7 needs to have a capacity sufficient for generating the target voltage even when the internal resistance is high.

Under the above circumstances, a configuration is adopted in which, when the temperature of the third conductive path 23 is within the predetermined first temperature range, the control unit 5 sets the target voltage to the first target voltage, and when the temperature of the third conductive path 23 is within the predetermined second temperature range that is higher than the first temperature range, the control unit 5 sets the target voltage to the second target voltage that is higher than first target voltage. In addition, it is envisioned that, when the temperature of the third conductive path 23 is relatively low, the temperature of the power storage unit 7 is also relatively low, and, when the temperature of the third conductive path 23 is relatively high, the temperature of the power storage unit 7 is also relatively high.

Therefore, when the temperatures of the power storage unit 7 and the third conductive path 23 are relatively low, the internal resistance of the power storage unit 7 is relatively high, but the target voltage is set to the first target voltage that is relatively low, and thus it is possible to mitigate the burden on the power storage unit 7 while suppressing excessive supply of power to the backup target load 93. Conversely, when the temperatures of the power storage unit 7 and the third conductive path 23 are relatively high, the resistance of the third conductive path 23 is relatively high, but the internal resistance of the power storage unit 7 is low, and thus it is possible to supply drive power to the backup target load 93 while suppressing an increase in the capacity of the power storage unit 7, by setting the target voltage to the second target voltage that is relatively high. Therefore, it is possible to effectively suppress an increase in the capacity of the power storage unit 7.

Furthermore, the temperature obtaining unit 5A of the backup power source control apparatus 1 obtains the temperature of the wire harness 23B serving as a power supply path that is included in the third conductive path 23, and extends from the substrate on which the discharge unit 3B is implemented to the load 93.

Therefore, it is possible to obtain the temperature of a portion of the third conductive path 23 separated from the substrate on which the discharge unit 3B that is likely to generate heat is implemented. In other words, it is possible to obtain the temperature of a portion that is unlikely to be affected by heat generated by the discharge unit 3B, and thus it is possible to obtain a more accurate temperature of the third conductive path 23. As a result, it is possible to more accurately determine a target voltage suitable for the temperature of the third conductive path 23 and the temperature of the power storage unit 7.

Fourth Embodiment

Next, an in-vehicle power source system 300 according to a fourth embodiment will be described.

The in-vehicle power source system 300 according to the fourth embodiment is different from the third embodiment in the flow of backup processing that is performed by the control unit 5 of the backup power source control apparatus 1, and the third and fourth embodiments are otherwise similar. The hardware configuration of the fourth embodiment is similar to that in FIG. 4, for example. Thus, in the fourth embodiment, a description of constituent elements similar to the third embodiment is omitted, and differences will mainly be described.

Figure 6:
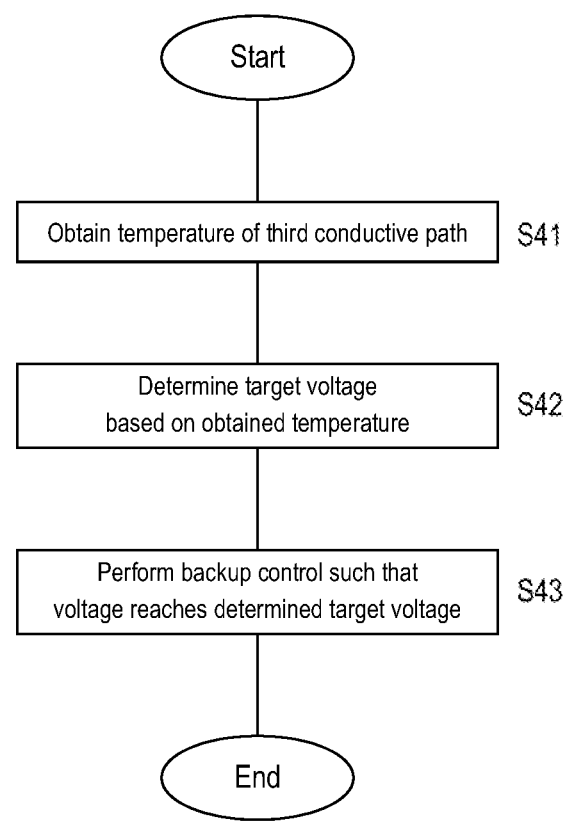
FIG. 6 is a flowchart showing a flow of backup processing according to a fourth embodiment.

When a predetermined backup start condition is met (for example, when the voltage of the conductive path 20 falls below the threshold value Vth), the control unit 5 of the backup power source control apparatus 1 according to the fourth embodiment starts the backup processing shown in FIG. 6. First, in step S41, the control unit 5 obtains the temperature of the third conductive path 23. Subsequently, in step S42, a target voltage is determined based on the obtained temperature. An equation for determining a target voltage based on a temperature is stored in advance, and a target voltage is determined based on this equation, for example.

The equation can be Expression 3 below, for example. Note that A and B are values (fixed values) determined based on a specific configuration of the in-vehicle power source system 300, Vt indicates a target voltage [V], and Tr indicates the temperature of the third conductive path 23 (temperature obtained by the temperature obtaining unit 5A) [° C.].

$$Vt = A \times Tr + B \quad (3)$$

Alternatively, the equation may also be Expression 4 below. Note that A, B, and C take values (fixed values) determined based on a specific configuration of the in-vehicle power source system 300, Vt indicates a target voltage [V], and Tr indicates the temperature of the third conductive path 23 (temperature obtained by the temperature obtaining unit 5A) [° C.].

$$Vt = A \times Tr^2 + B \times Tr + C \tag{4}$$

Note that the equation is an equation for determining a larger target voltage (Vt) for a higher temperature (Tr) of the third conductive path 23.

The control unit 5 calculates Vt by substituting the temperature obtained in step S41 into Tr in the above equation, and determines calculated Vt as being a target voltage. At this time, the higher the temperature obtained by the temperature obtaining unit 5A is, the higher the target voltage the control unit 5 determines. After the target voltage is determined, backup control is performed in step S43 such that the voltage that is applied to the second conductive path 22 by the discharge unit 3B reaches the target voltage determined in step S42. The backup control is similar to the third embodiment, and thus a description thereof is omitted.

Next, effects of this configuration will be illustrated.

The control unit 5 of the in-vehicle backup power source control apparatus 1 according to the fourth embodiment controls the voltage conversion operation such that the output voltage that is applied to the second conductive path 22 by the discharge unit 3B reaches the target voltage. It is necessary to determine the target voltage at this time in anticipation of power loss due to the resistance of the third conductive path 23 that connects the second conductive path 22 and the load 93. In particular, when the temperature of the third conductive path 23 is high, the resistance of the third conductive path 23 is high, and thus it is necessary to determine the target voltage so as to supply power required for driving the load 93 to the load 93 even when the resistance of the third conductive path 23 is high. On the other hand, when the temperature of the power storage unit 7 is low, the internal resistance of the power storage unit 7 is high. Thus, the power storage unit 7 needs to have a capacity that is sufficient for generating the target voltage even when the internal resistance is high.

Under the above circumstances, a configuration is adopted in which the higher the temperature of the third conductive path 23 is, the higher the target voltage the control unit 5 sets. In addition, it is envisioned that, when the temperature of the third conductive path 23 is relatively low, the temperature of the power storage unit 7 is also relatively low, and when the temperature of the third conductive path 23 is relatively high, the temperature of the power storage unit 7 is also relatively high.

Therefore, when the temperatures of the power storage unit 7 and the third conductive path 23 are relatively low, the internal resistance of the power storage unit 7 is relatively high, but the target voltage is set to a relatively low target voltage, and thus it is possible to mitigate the burden on the power storage unit 7 while suppressing excessive supply of power to the backup target load 93. Conversely, when the temperatures of the power storage unit 7 and the third conductive path 23 are relatively high, the resistance of the third conductive path 23 is relatively high, but the internal resistance of the power storage unit 7 is low, and thus it is possible to supply drive power to the backup target load 93 while suppressing an increase in the capacity of the power storage unit 7, by setting the target voltage to a relatively high target voltage. Therefore, it is possible to effectively suppress an increase in the capacity of the power storage unit 7.

Fifth Embodiment

Next, an in-vehicle power source system 500 according to a fifth embodiment will be described.

The in-vehicle power source system 500 according to the fifth embodiment is different from the first embodiment in that an in-vehicle backup power source control apparatus 501 includes a charging/discharging unit 503B in place of the charge unit 3A and the discharge unit 3B of the backup power source control apparatus 1 according to the first embodiment, and the charging/discharging unit 503B is electrically connected to a conductive path 520 for supplying power from the in-vehicle power source unit 91 to the load 93, otherwise other constituent elements are similar to those of the first embodiment. The same reference numerals are assigned to portions of the in-vehicle power source system 500 that are similar to those of the in-vehicle power source system 100 according to the first embodiment, and a detailed description thereof is omitted. Note that the configuration of hardware of the in-vehicle power source system 500 according to the fifth embodiment is applicable to not only the configuration of the first embodiment but also the configurations of the second to fourth embodiments.

Figure 7:
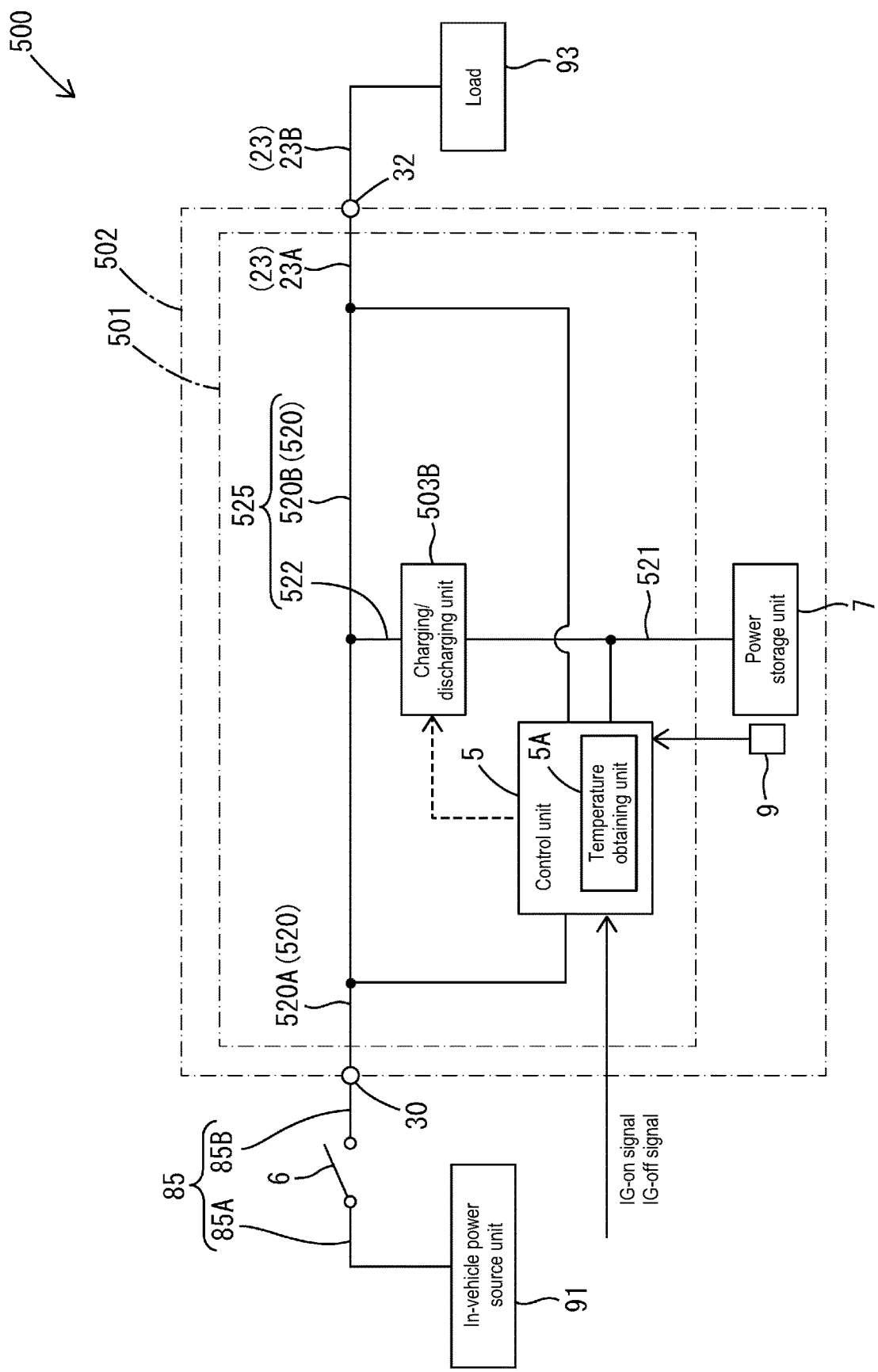
FIG. 7 is a circuit diagram schematically showing an in-vehicle power source system that includes a backup power source control apparatus according to a fifth embodiment.

FIG. 7 shows a block diagram of the in-vehicle power source system 500 that includes the in-vehicle backup power source control apparatus 501 (hereinafter, also referred to as "the backup power source control apparatus 501") according to the fifth embodiment. The in-vehicle power source system 500 includes the in-vehicle power source unit 91, the load 93, the power storage unit 7, and the temperature detection unit 9, which are similar to those of the in-vehicle power source system 100 according to the first embodiment. Furthermore, the in-vehicle power source system 500 includes the backup power source control apparatus 501 that has a function of promptly discharging the power storage unit 7 when power supply from the in-vehicle power source unit 91 is suspended, and is configured as a system that supplies power to the load 93 using the in-vehicle power source unit 91 or the power storage unit 7 as a power supply source.

The backup power source control apparatus 501 is an apparatus that controls a discharge operation of the power storage unit 7, using, as a backup power source, the power storage unit 7 that is charged based on power supply from the in-vehicle power source unit 91. This backup power source control apparatus 501 includes the charging/discharging unit 503B, and has a configuration in which a switch is made between discharge and discharge stop of the power storage unit 7 using the charging/discharging unit 503B, and power from the power storage unit 7 can be supplied to the backup target load 93 during discharge. In addition, the in-vehicle backup power source apparatus 502 is configured to include the backup power source control apparatus 501, the power storage unit 7, and the temperature detection unit 9.

The backup power source control apparatus 501 mainly includes the conductive path 520, a conductive path 522, a first conductive path 521, the charging/discharging unit 503B, the control unit 5, and the like.

The conductive path 520 is a conductive path serving as a path for supplying power from the in-vehicle power source unit 91 to the load 93, one end of the conductive path 520 is electrically connected to the input terminal 30, and the other end is electrically connected to the third conductive path 23. The conductive path 520 is electrically connected to the wire portion 85 via the input terminal 30. When the IG relay 6 enters the on-state, power is supplied from the in-vehicle power source unit 91 to the load 93 via the conductive path 520 and the third conductive path 23. The conductive path 520 includes a power source unit-side conductive path 520A on the in-vehicle power source unit 91 side relative to a connection portion connected to the conductive path 522 and a load-side conductive path 520B on the load 93 side relative to a connection portion connected to the conductive path 522. The load-side conductive path 520B (the conductive path 520) is electrically connected to the third conductive path 23.

The conductive path 522 is a conductive path that electrically connects the conductive path 520 and the charging/discharging unit 503B. The conductive path 522, along with the load-side conductive path 520B, constitutes a second conductive path 525.

The first conductive path 521 is a conductive path that electrically connects the charging/discharging unit 503B and the power storage unit 7, and is a conductive path serving as a charging path extending from the charging/discharging unit 503B to the power storage unit 7 and a discharging path extending from the power storage unit 7 to the charging/discharging unit 503B.

The charging/discharging unit 503B corresponds to an example of a voltage conversion unit, and is configured as a known charging/discharging circuit such as a step-up/step-down DC-DC converter. The charging/discharging unit 503B can perform a charge operation for charging the power storage unit 7 based on power from the in-vehicle power source unit 91 and a charging stop operation for stopping charging of the power storage unit 7. In addition, the charging/discharging unit 503B can perform a discharge operation for discharging the power storage unit 7 based on power from the in-vehicle power source unit 91 and a discharge stop operation for stopping discharging of the power storage unit 7. The charge operation and discharge operation that are performed by the charging/discharging unit 503B are controlled by the control unit 5.

A charge instruction signal instructing that the power storage unit 7 be charged or a charge stop signal instructing that charging of the power storage unit 7 be stopped is supplied to the charging/discharging unit 503B by the control unit 5. When the charge instruction signal is supplied from the control unit 5 to the charging/discharging unit 503B, the charging/discharging unit 503B performs a voltage conversion operation for stepping up a power source voltage that is input from the in-vehicle power source unit 91 via the conductive path 520 and the conductive path 522, and applies the stepped-up voltage to the power storage unit 7 via the first conductive path 521. When the charge stop signal is supplied from the control unit 5 to the charging/discharging unit 503B, the charging/discharging unit 503B does not perform the charge operation.

When a discharge instruction signal is supplied from the control unit 5, the charging/discharging unit 503B performs a discharge operation for outputting a target voltage determined for the second conductive path 525 (the conductive path 522) (specifically, a discharge operation for applying a target voltage instructed for the second conductive path 525 (the conductive path 522) by the control unit 5), based on the input voltage (output voltage from the power storage unit 7) applied to the first conductive path 521, and, when a discharge stop signal is supplied from the control unit 5, the charging/discharging unit 503B stops the above discharge operation. Accordingly, the charging/discharging unit 503B can step up or down the voltage applied to the first conductive path 521, and perform the discharge operation (voltage conversion operation) for applying the output voltage to the second conductive path 525 (the conductive path 522).

A configuration is adopted in which the voltage of the power source unit-side conductive path 520A (in other words, the output voltage value of the in-vehicle power source unit 91) is input to the control unit 5, and the control unit 5 can continuously monitor the voltage of the power source unit-side conductive path 520A. Note that the configuration shown in FIG. 1 is merely exemplary, and any configuration in which the control unit 5 can detect the output voltage of the in-vehicle power source unit 91 may be adopted, and a voltage at another position may also be monitored if the position is on a path that is electrically connected to the in-vehicle power source unit 91.

In addition, a configuration is adopted in which the voltage of the first conductive path 521 (in other words, the output voltage (charging voltage) of the power storage unit 7) is input to the control unit 5, and the control unit 5 can continuously monitor the voltage of the first conductive path 521.

A configuration is adopted in which the voltage of the second conductive path 525 (in other words, the output voltage value of the charging/discharging unit 503B) is input to the control unit 5, and the control unit 5 can continuously monitor the voltage of the second conductive path 525.

In addition, the control unit 5 includes the temperature obtaining unit 5A that obtains the temperature of the power storage unit 7. A configuration is adopted in which the temperature detected by the temperature detection unit 9 (in other words, the temperature of the power storage unit 7) is input to the temperature obtaining unit 5A, and the control unit 5 can continuously monitor the temperature detected by the temperature detection unit 9.

Note that the configuration in which a value indicating the voltage of each path is input to the control unit 5 may also be a configuration in which the voltage of each path is directly input to the control unit 5 as shown in FIG. 1, or a voltage obtained by dividing the voltage of each path using a voltage-dividing circuit or the like may also be input to the control unit 5.

The control unit 5 can control the charge operation and discharge operation that are performed by the charging/discharging unit 503B. Specifically, the control unit 5 can provide the charge instruction signal or charge stop signal to the charging/discharging unit 503B, and can also provide the discharge instruction signal or discharge stop signal. The control unit 5 can control the discharge operation (voltage conversion operation) such that the output voltage that is applied to the second conductive path 525 by the charging/discharging unit 503B reaches the target voltage, by supplying the discharge instruction signal to the charging/discharging unit 503B.

Note that operations of the backup power source control apparatus 501 are similar to the operations of the backup power source control apparatus 1 according to the first embodiment, and thus a description thereof is omitted.

Other Embodiments

The present disclosure is not limited to the embodiments described above with reference to the drawings, and for example, the following embodiments are also included in the technical scope of the present disclosure.

In the above embodiments, a lead battery is used as the in-vehicle power source unit 91, but there is no limitation to this configuration, and, in any example in the present specification, another power source means (another known power storage means, electricity generation means, or the like) may also be used as the in-vehicle power source unit 91 in place of or in addition to the lead battery. The number of power source means constituting the in-vehicle power source unit 91 is not limited to one, and a plurality of power source means may also constitute the in-vehicle power source unit 91.

In the above embodiments, an electric double layer capacitor (EDLC) is used as the power storage unit 7, but there is no limitation to this configuration, and, in any example in the present specification, another power storage means such as a lithium ion battery, a lithium ion capacitor, or a nickel-hydrogen battery may also be used as the power storage unit 7. In addition, the number of power storage means constituting the power storage unit 7 is not limited to one, and a plurality of power storage means may also constitute the power storage unit 7.

In the above first, third, and fifth embodiments, the first temperature range is a low temperature range, but there is no limitation to this configuration. It suffices for the first temperature range to be a temperature range that is lower than the second temperature range, and, for example, the first temperature range may also be an ordinary and low temperature range. In addition, the second temperature range is a range of temperatures that are not low temperatures, but there is no limitation to this configuration. It suffices for the second temperature range to be a temperature range that is higher than the first temperature range, and the second temperature range may also be a high temperature range, for example.

In the above first, third, and fifth embodiments, the number of temperature ranges for determining a target temperature is two, but may also be three or more. In this case, a target temperature can be determined for each temperature range.

In the above first, third, and fifth embodiments, the first target voltage is 9 V, and the second target voltage is 10 V, but there is no limitation to this configuration. It suffices for the first target voltage to be a voltage that is lower than the second target voltage, and it suffices for the second target voltage to be a voltage that is higher than the first target voltage.

In the above fifth embodiment, the conductive path 522 is connected to the third conductive path 23 via the conductive path 520 (the load-side conductive path 520B), but the conductive path 522 may also be directly connected to the third conductive path 23. In this case, the conductive path 522 corresponds to an example of a second conductive path.

In the above second and fourth embodiments, a target voltage is determined based on an equation and a temperature obtained by the temperature obtaining unit 5A, but another method may also be adopted. A configuration may also be adopted in which, for example, a table indicating the correspondence relation between a temperature obtained by the temperature obtaining unit 5A and a target voltage is stored in advance, and a target voltage corresponding to a temperature obtained by the temperature obtaining unit 5A is determined by referencing this table.

In the above first to fifth embodiments, the control unit 5 obtains the temperature detected by the temperature detection unit 9 during backup processing, but the control unit 5 may also obtain the temperature before backup processing. Accordingly, a configuration may also be adopted in which the temperature detected by the temperature detection unit 9 is obtained before power supply from the in-vehicle power source unit 91 is suspended, and the control unit 5 determines a target voltage in backup processing based on the obtained temperature.

In the above first to fifth embodiments, a configuration is adopted in which the in-vehicle backup power source apparatuses 2 and 502 are each used as a control substrate, and the power storage unit 7 and the temperature detection unit 9 are disposed on the substrate, but a configuration may also be adopted in which the in-vehicle backup power source control apparatuses 1 and 501 are each used as a control substrate, and the power storage unit 7, the temperature detection unit 9, and the like are disposed outside of the control substrate.

In the above first to fifth embodiments, a configuration is adopted in which the input terminal 30 and the output terminal 32 are disposed in the in-vehicle backup power source apparatuses 2 and 502, but a configuration may also be adopted in which the input terminal 30 and the output terminal 32 are disposed in the backup power source control apparatuses 1 and 501.

The invention claimed is:

1. An in-vehicle backup power source control apparatus that uses, as a backup power source, a power storage unit that is charged by an in-vehicle power source unit, and controls a discharge operation of the power storage unit, the apparatus comprising:
    a voltage conversion unit that performs a voltage conversion operation for stepping up or down a voltage applied to a first conductive path that is a path through which power is supplied from the power storage unit, and applying an output voltage to a second conductive path that, along with a third conductive path that is connected to a backup target load, constitutes a path for supplying power to the backup target load;
    a control unit that controls the voltage conversion operation such that the output voltage that is applied to the second conductive path by the voltage conversion unit reaches a target voltage; and
    a temperature obtaining unit that obtains a temperature of the power storage unit,
    wherein, when the temperature obtained by the temperature obtaining unit is within a predetermined first temperature range, the control unit sets the target voltage to a first target voltage, and, when the temperature obtained by the temperature obtaining unit is within a predetermined second temperature range that is higher than the predetermined first temperature range, the control unit sets the target voltage to a second target voltage that is higher than the first target voltage.

2. An in-vehicle backup power source control apparatus that uses, as a backup power source, a power storage unit that is charged by an in-vehicle power source unit, and controls a discharge operation of the power storage unit, the apparatus comprising:
    a voltage conversion unit that performs a voltage conversion operation for stepping up or down a voltage applied to a first conductive path that is a path through which power is supplied from the power storage unit, and applying an output voltage to a second conductive path that, along with a third conductive path that is connected to a backup target load, constitutes a path for supplying power to the backup target load;
    a control unit that controls the voltage conversion operation such that the output voltage that is applied to the second conductive path by the voltage conversion unit reaches a target voltage; and a temperature obtaining unit that obtains a temperature of the power storage unit, wherein the higher the temperature obtained by the temperature obtaining unit is, the higher the target voltage the control unit sets.

3. An in-vehicle backup power source control apparatus that uses, as a backup power source, a power storage unit that is charged by an in-vehicle power source unit, and controls a discharge operation of the power storage unit, the apparatus comprising:

a voltage conversion unit that performs a voltage conversion operation for stepping up or down a voltage applied to a first conductive path that is a path through which power is supplied from the power storage unit, and applying an output voltage to a second conductive path that, along with a third conductive path that is connected to a backup target load, constitutes a path for supplying power to the backup target load;

a control unit that controls the voltage conversion operation such that the output voltage that is applied to the second conductive path by the voltage conversion unit reaches a target voltage; and a temperature obtaining unit that obtains a temperature of the third conductive path, wherein, when the temperature obtained by the temperature obtaining unit is within a predetermined first temperature range, the control unit sets the target voltage to a first target voltage, and, when the temperature obtained by the temperature obtaining unit is within a predetermined second temperature range that is higher than the predetermined first temperature range, the control unit sets the target voltage to a second target voltage that is higher than the first target voltage.

4. An in-vehicle backup power source control apparatus that uses, as a backup power source, a power storage unit that is charged by an in-vehicle power source unit, and controls a discharge operation of the power storage unit, the apparatus comprising:

a voltage conversion unit that performs a voltage conversion operation for stepping up or down a voltage applied to a first conductive path that is a path through which power is supplied from the power storage unit, and applying an output voltage to a second conductive path that, along with a third conductive path that is connected to a backup target load, constitutes a path for supplying power to the backup target load;

a control unit that controls the voltage conversion operation such that the output voltage that is applied to the second conductive path by the voltage conversion unit reaches a target voltage; and a temperature obtaining unit that obtains a temperature of the third conductive path, wherein the higher the temperature obtained by the temperature obtaining unit is, the higher the target voltage the control unit sets.

5. The in-vehicle backup power source control apparatus according to claim 3, wherein the temperature obtaining unit obtains a temperature of a wire harness serving as a power supply path that is included in the third conductive path and extends from a substrate on which the voltage conversion unit is implemented to the backup target load.

* * * * *